Patented May 5, 1953

2,637,714

UNITED STATES PATENT OFFICE 2,637,714

PLASTICIZED VINYL HALIDE

William S. Emerson and Raymond I. Longley, Jr., Dayton, Ohio, assignors to Monsanto Chemical Company, St. Louis, Mo., a corporation of Delaware No Drawing. Application May 26, 1951, Serial No. 228,534

7 Claims. (Cl. 260—31.4)

This invention relates to compositions comprising polymers of vinyl halides and relates more particularly to compositions comprising vinyl chloride polymers plasticized with certain mixed esters of glycols and both aliphatic and aromatic monocarboxylic acids.

A wide variety of plasticizers has been employed for the purpose of improving the physical properties of vinyl chloride polymers. Particular attention has been given to the improvement of flexibility and heat and light stability of such plasticized compositions. In many instances the improvement in flexibility has been obtainable only by sacrificing other desirable properties of an ideal polyvinyl chloride composition, such as low volatility, color and heat stability, water absorption, etc.

Now we have found that very good flexibility, without sacrifice of temperature stability and low volatility, is imparted to vinyl chloride polymers when there is employed with the polymers a mixture of esters made by condensing diethylene glycol with a mixture of acids consisting of an aliphatic monoolefinic acid of from 10 to 20 carbon atoms and an aromatic acid selected from the class consisting of benzoic acid and the toluic acids, at least 10%, but less than 50%, by weight of said mixture of acids being said olefinic acid.

The mixture of esters thus obtained consists of dialkenyl esters of the glycol in which each alkenyl radical has from 9 to 19 carbon atoms, di-aryl esters of the glycol in which the aryl radical is phenyl or tolyl, and mixed di-esters of the glycol in which one acid residue is derived from the aliphatic, mono-olefinic acid and the other from the aromatic acid. When the mono-olefinic acid is present in the mixture of acids employed in an amount of at least 10%, but not more than 50% by weight, based on the total weight of said acid mixture, the resulting mixture of esters possesses plasticizing properties for vinyl chloride polymers which are superior to those of either the diaryl esters or the dialkenyl esters of the glycol, or mixtures of the same. The presence of even small amounts of the mixed aryl alkylene esters which result from the inclusion of as little as 10% by weight of the aliphatic, mono-olefinic acid in the esterification process results in greatly increased plasticizing efficiency. When the mono-olefinic acid is present in an amount of 50% by weight or more in the acid mixture, the resulting mixture of acids still possesses the property of imparting flexibility to vinyl chloride polymers, but the compatibility of the mixture of esters with the polymers decreases with increasing content of the aliphatic acid in the esterification mixture. Some decrease in compatibility is noted with esters prepared from acid mixtures containing from 30% to 50% of the olefinic acid, when such esters are employed in high proportions, i. e., in proportions of more than 50% of plasticizer based on the weight of the plasticized product.

Mono-olefinic fatty acids used for the esterification include decenoic acid, undecenoic acid, palmitoleic acid, elaidic acid, oleic acid, etc. The alkylbenzoic acids which may be used include 2-, 3-, or 4-toluic acid, commercial mixtures of the toluic acids, etc.

The mixtures of esters are prepared by conventional esterification procedures, for example, by refluxing the glycols with a mixture of the acids in substantially stoichiometric proportions, in the presence or absence of an esterifying catalyst, until substantially complete esterification of the glycol has occurred.

While the molar ratio of glycol to total acid is generally 1:2, this ratio may be varied, since any unreacted glycol is readily removed from the reaction product. When employing the higher boiling acids, it is advantageous to employ an excess of the glycol in order to assure complete reaction of the more difficultly volatilizable acids.

The present mixtures of esters are valuable plasticizers for polyvinyl chloride and copolymers of at least 70 per cent by weight of vinyl chloride and up to 30 per cent by weight of an unsaturated monomer copolymerized therewith, for example, vinyl acetate, vinylidene chloride, etc. The present products impart great flexibility to vinyl chloride polymers at very low temperatures; they are compatible with such polymers, and show no exudation of plasticizer even at plasticizer content of up to 50 per cent.

Although the quantity of plasticizer will depend upon the particular polymer to be plasticized and upon its molecular weight, it is generally found that compositions having from 5% to 50% by weight of plasticizer will, in most cases, be satisfactory for general utility. The good flexibility of the plasticized compositions increases with increasing plasticizer concentration.

In evaluating plasticizer efficiency use is made of the following empirical testing procedures:

*Compatibility.*—Visual inspection of the plasticized composition is employed; incompatibility of the plasticizer with the polymer being demonstrated by cloudiness and exudation of the plasticizer.

*Low temperature flexibility.*—Low temperature flexibility is one of the most important properties of elastomeric vinyl compositions. While many plasticizers will produce flexible compositions at room temperature, the flexibility of these compositions at a low temperature may vary considerably, i. e., plasticized polyvinyl chloride compositions that are flexible at room temperature often become very brittle and useless at low temperatures. Low temperature flexibility tests herein employed are according to the Clash-Berg method. This value may be considered as the lower temperature limit of the plasticized composition's usefulness as an elastomer.

*Volatility.*—Just as a decrease in temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized compositions become stiff and hard. The test for plasticizer volatility herein employed is that described by the American Society for Testing Materials under the designation D-744-44T.

The invention is further illustrated, but not limited, by the following examples.

Example 1

A mixture consisting of 3.0 moles of diethylene glycol, 5.0 moles of benzoic acid and 1.0 mole of oleic acid in benzene solution was refluxed for 20 hours at a temperature of 210° to 230° C. Removal of unreacted material by distilling to 182° C./0.3 mm., gave as residue a mixture comprising diethylene glycol dibenzoate, diethylene glycol benzoate-oleate, and diethylene glycol dioleate.

Example 2

Sixty parts of polyvinyl chloride and 40 parts by weight of the mixture of esters of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 36° C., which value denotes extremely good low temperature properties. Tests on the volitility characteristics of the plasticized composition gave a value of 4.3 per cent. When subjected to heat at a temperature of 325° F. for a period of 30 minutes the clarity and color of the molded product were substantially unchanged. Similar tests conducted with the dibenzoate of diethylene glycol, alone, gave a flexibility value of minus 19° C.

While the above example shows a composition in which the ratio of plasticizer to polymer content is 40:60, depending upon the properties desired in the final product, for many purposes a plasticizer content of, say, from only 10% to 20% is preferred. The present mixture of esters are compatible with polyvinyl chloride over wide ranges of concentrations, up to 50% of esters, based on the total weight of the plasticized composition, yielding desirable products.

Although the invention has been described particularly with reference to the use of the present mixture of esters as plasticizers for polyvinyl chloride, these mixtures are advantageously employed also as plasticizers for copolymers of vinyl chloride, for example, the copolymers of vinyl chloride with vinyl acetate, or vinylidene chloride, etc. Preferably, such copolymers have a high vinyl chloride content, i. e., a vinyl chloride content of at least 70 per cent by weight of vinyl chloride and up to 30 per cent by weight of the copolymerizable monomer.

The plasticized polyvinyl halide compositions of the present invention have good thermal stability; however, for many purposes it may be advantageous to use known stabilizers in the plasticized compositions. Inasmuch as the present mixtures of esters are substantially unreactive with the commercially available heat and light stabilizers which are commonly employed with polyvinyl chloride or copolymers thereof, the presence of such materials in the plasticized products does not impair the valuable properties of the present esters. The present esters are of general utility in softening vinyl chloride polymers. They may be used as the only plasticizing component in a compounded vinyl chloride polymer or they may be used in conjunction with other plasticizers.

What we claim is:

1. A resinous composition comprising a vinyl chloride polymer plasticized with a mixture of esters made by condensing diethylene glycol with a mixture of acids consisting of an aliphatic mono-olefinic acid of from 10 to 20 carbon atoms and an aromatic acid selected from the class consisting of benzoic acid and the toluic acids, said mixture of acids consisting of at least 10%, but less than 50%, by weight of the mono-olefinic acid.

2. A resinous composition comprising polyvinyl chloride plasticized with a mixture of esters made by condensing diethylene glycol with a mixture of acids consisting of an aliphatic mono-olefinic acid of from 10 to 20 carbon atoms and an aromatic acid selected from the class consisting of benzoic acid and the toluic acids, said mixture of acids consisting of at least 10%, but less than 50%, by weight of the mono-olefinic acid.

3. A resinous composition comprising polyvinyl chloride plasticized with a mixture of esters made by condensing diethylene glycol with a mixture of acids consisting of an aliphatic mono-olefinic acid of from 10 to 20 carbon atoms and an aromatic acid selected from the class consisting of benzoic acid and the toluic acids, said mixture of acids consisting of at least 10%, but less than 50%, by weight of the mono-olefinic acid, said mixture of esters being from 5 to 50 per cent by weight of the composition.

4. A resinous composition comprising a copolymer of at least 70% by weight of vinyl chloride and up to 30% by weight of an unsaturated monomer copolymerizable therewith, said copolymer being plasticized with a mixture of esters made by condensing diethylene glycol with a mixture of acids consisting of an aliphatic mono-olefinic acid of from 10 to 20 carbon atoms and an aromatic acid selected from the class consisting of benzoic and toluic acids, said mixture of acids consisting of at least 10%, but less than 50% by weight, of the mono-olefinic acid.

5. A resinous composition comprising a copolymer of at least 70% by weight of vinyl chloride and up to 30% by weight of an unsaturated monomer copolymerizable therewith, said copolymer being plasticized with a mixture of esters made by condensing diethylene glycol with a mixture of acids consisting of an aliphatic mono-olefinic acid of from 10 to 20 carbon atoms and an aromatic acid selected from the class consisting of benzoic and toluic acids, said mixture of acids, consisting of at least 10%, but less than 50% by weight, of the mono-olefinic acid, and said mixture of esters being from 5 to 50 per cent of the weight of the resinous composition.

6. A resinous composition comprising polyvinyl chloride plasticized with a mixture of esters made by condensing diethylene glycol with a mixture of oleic acid and benzoic acid, said mixture of acids consisting of at least 10%, but less than 50% by weight, of oleic acid.

7. A resinous composition comprising polyvinyl chloride plasticized with a mixture of esters made by condensing diethylene glycol with a mixture of oleic acid and benzoic acid, said mixture of acids consisting of at least 10%, but less than 50% by weight, of oleic acid, and said mixture of esters being from 5 to 50 per cent of the weight of the composition.

WILLIAM S. EMERSON.
RAYMOND I. LONGLEY, Jr.

References Cited in the file of this patent

UNITED STATES PATENTS

| Number | Name | Date |
|---|---|---|
| 1,739,315 | Kessler | Dec. 10, 1929 |

FOREIGN PATENTS

| Number | Country | Date |
|---|---|---|
| 496,574 | Great Britain | Dec. 1, 1938 |

OTHER REFERENCES

Ser. No. 404,514, Manchen (A. P. C.), published April 20, 1943.